United States Patent [19]

Tateoka

[11] 4,192,220

[45] Mar. 11, 1980

[54] VACUUM BOOSTER

[75] Inventor: Kiyoshi Tateoka, Fujisawa, Japan

[73] Assignee: Tokico Ltd., Kanagawa, Japan

[21] Appl. No.: 787,457

[22] Filed: Apr. 14, 1977

[30] Foreign Application Priority Data

Apr. 20, 1976 [JP] Japan .................. 51-49614[U]

[51] Int. Cl.² .................. F15B 9/10; F01B 9/00
[52] U.S. Cl. .................. 91/376 R; 91/369 B;
92/29; 403/155; 403/326
[58] Field of Search .............. 91/369 B, 369 A, 369 R,
91/376 R; 403/155, 326, DIG. 7, DIG. 6;
92/29, 30

[56] References Cited

U.S. PATENT DOCUMENTS

| 1,397,101 | 11/1921 | Kelly | 403/DIG. 6 |
| 1,882,625 | 10/1932 | Jacobi | 403/326 |
| 2,926,033 | 2/1960 | Zarrillo | 403/326 |
| 3,471,186 | 10/1969 | Luebbert et al. | 403/326 |
| 3,938,424 | 2/1976 | Ohmi | 91/369 B |

FOREIGN PATENT DOCUMENTS

| 2320853 | 11/1972 | Fed. Rep. of Germany | 91/369 B |
| 19177 | of 1914 | United Kingdom | 248/408 |

*Primary Examiner*—Paul E. Maslousky
*Attorney, Agent, or Firm*—Wenderoth, Lind & Ponack

[57] ABSTRACT

A vacuum booster including a casing, a power piston having a resilient diaphragm and dividing the interior of the casing into two chambers, an input rod for actuating a valve mechanism to generate differential pressure between the two chambers, and an output rod receiving a force in accordance with the differential pressure from the power piston, wherein the inner end of the output rod is received slidably on a member of power piston side with male and female engagement therebetween, and a groove is formed in the male member for engaging with a clip which allows a predetermined amount of relative sliding movement between the male and female members.

1 Claim, 8 Drawing Figures

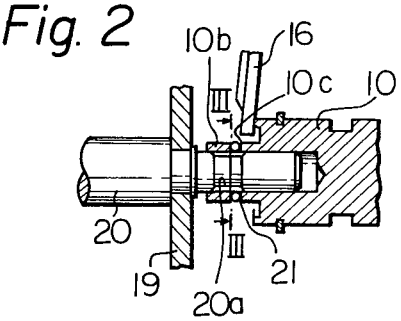
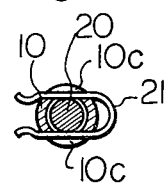
Fig. 2   Fig. 3
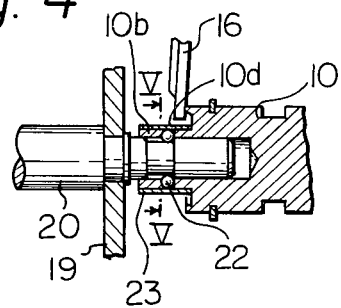
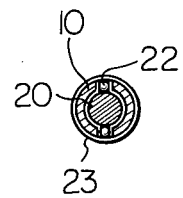
Fig. 4   Fig. 5
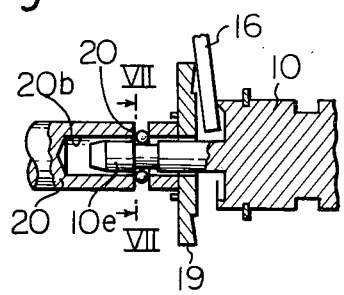
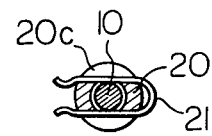
Fig. 6   Fig. 7

VACUUM BOOSTER

This invention relates to improvements in a vacuum booster for use in vehicle braking systems. One prior art vacuum booster comprises a movable diaphragm dividing the interior of a casing or a main body into two chambers, a plurality of reaction levers for receiving the force due to the differential pressure acting on the diaphragm and transmitting the force to an output rod at one end thereof through a piston plate, and an input rod receiving the reaction of the differential pressure force from the reaction levers at the other end thereof through a plunger.

Usually the output rod is inserted slidably into the plunger acting as a bearing supporting the inner end of the output rod. Therefore, the output rod is prone to falling out of the plunger when the vacuum booster is operated as a single unit or during assembling or transporting operations, and such events should be prevented since the internal parts will be damaged if the booster is be operated under such conditions.

An object of the present invention is to provide a vacuum booster eliminating the shortcomings described.

Some embodiments of the present invention will be described in detail with reference to the accompanying drawings, in which:

FIG. 2 is an enlarged cross-sectional view showing details of portion A in FIG. 1;

FIG. 3 is a cross-sectional view taken along line III—III in FIG. 2;

FIG. 4 and FIG. 6 are views similar to FIG. 2 but showing modified forms respectively;

FIG. 5 is a cross-sectional view taken along line V—V in FIG. 4;

FIG. 7 is a cross-sectional view taken along line VII—VII in FIG. 6; and

Figure 1:
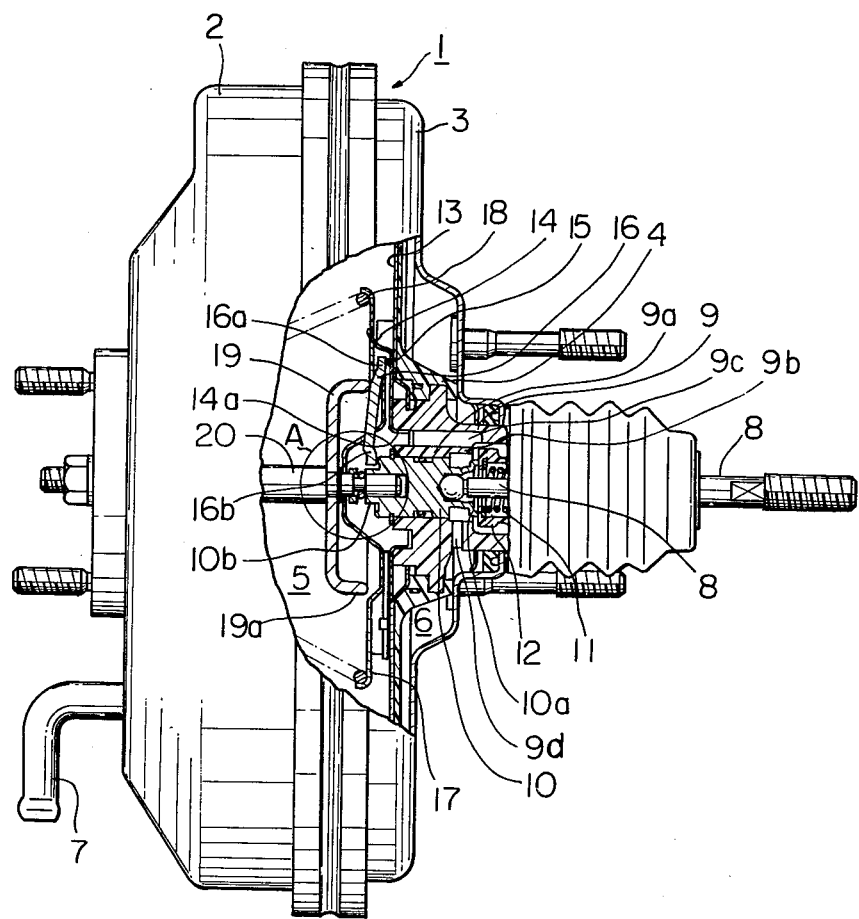
FIG. 1 is a partial cross-sectional side view of a vacuum booster exemplifying the present invention.

In the vacuum booster shown in FIGS. 1 and 2, a casing generally designated by the reference numeral 1 is made up of two cup-shaped parts or a front shell 2 and a rear shell 3 which are clamped together with the outer periphery of an elastic diaphragm 4 therebetween. The diaphragm 4 and a valve mechanism connected to the diaphragm (which will be described in detail hereinafter) cooperate to divide the interior of the casing 1 into a front chamber 5 and a rear chamber 6. A pipe 7 is connected to the casing 1 to communicate the front chamber 5 with a source of vacuum pressure such as an intake manifold of an engine of a vehicle.

One end (the right end) of an input rod 8 projecting from the casing 1 is connected to a brake pedal (not shown), and the other end of the input rod 8 is connected to a plunger 10 which is slidably fitted in a cylinder portion 9a of a valve body 9.

Valve seats 10a and 9b are formed respectively on the right ends (as viewed in FIG. 1) of the plunger 10 and the cylinder portion 9a of the valve body 9. A poppet valve 12 formed of elastic material and biassed by a spring 11 acts to contact with or be spaced from the valve seats 10a and 9b selectively. The valve seats 9a, 9b and the poppet valve 12 constitute the valve mechanism described.

In the unactuated condition of the vacuum booster shown in FIG. 1, the poppet valve 12 abuts the valve seat 10a and is separated from the valve seat 9b. The front chamber 5 is communicated with the rear chamber 6 through axial and radial passages 9c and 9d formed in the valve body 9. The chambers 5 and 6 are separated from atmosphere (the interior of the valve body 9 on the right side of the poppet valve 12 is communicated permanently with the atmosphere).

On the outer periphery of the valve body 9 are fitted and secured the inner periphery of the diaphragm 4 and the inner periphery of a piston plate 13. The piston plate 13 is adapted to move with the diaphragm 4 and receive a force corresponding to the differential pressure acting on the diaphragm.

On the left side of the piston plate 13 is a metal plate 14 having projecting and depressing portions with the inner periphery 14a being fitted on the valve body 9. The metal plate 14 has retaining pawls (not shown) formed by cutting and bending portions of the metal plate so they project from the plane of the plate for retaining rod-shaped members 15 which act as fulcrums against rocking movement of reaction levers 16.

The reaction levers 16 are generally rectangular shaped plates and a plurality (three in the embodiment) of the levers are disposed radially relative to the plunger 10, with tip end portions 16a engaging with the central portions of rod shaped members 15 respectively, and the base end portions 16b engaging with the left end of the plunger 10 respectively.

Shown at 17 is a generally dish shaped cover plate which is biassed rightward in FIG. 1 by a return spring 18 acting between the outer peripheral portion of the cover plate 17 and the inside side wall of the front shell 2, and transmits rightward force to the piston plate 13, the diaphragm 4 and the valve body 9.

Shown at 19 is a fulcrum plate having a generally U-shaped cross-section with the tip end portion 19a engaging with the reaction levers 16 and the central portion fitted on an output rod 20.

One end of the output rod 20 projects outside of the casing 1 and the other end (the inner end) thereof is fitted in a bearing 10b formed in the plunger 10. The output rod 20 is retained by retaining means (described hereinafter in detail) such as a clip or the like so as to prevent it from falling or escaping out of the bearing even when a leftward force acts on the output rod incidentally.

In the vacuum booster having the construction as described, when a thrust is imparted to the input rod 8, the plunger 10 and the poppet valve 12 being biassed by the spring 11 will be moved leftward in the valve body 9 which is stationary at that time. The poppet valve 12 contacts the valve seat 9b formed on the valve body 9 to interrupt the communication between the front chamber 5 and the rear chamber 6.

When the input rod 8 is moved further in the same direction, the valve seat 10a on the plunger 10 separates from the poppet valve 12 thereby introducing atmospheric air through the annular opening thus formed and the passage 9d into the rear chamber 6. A differential pressure is generated across the opposite sides of the diaphragm 4 and the differential pressure created force thus produced is transmitted to the reaction levers 16 through the piston plate 13, the metal plate 14 and rod shaped members 15 retained on the metal plate 14. The force is transmitted to the output rod 20 from one side (the left side) of reaction levers 16 through the fulcrum plate 19, and reaction force is transmitted to the input rod 8 from the other side of reaction levers 16 through the plunger 10. The valve body 9 will move leftward so that the poppet valve 12 engages with the valve seat 10a of the plunger 10 to attain an equilibrium condition. When the input rod 8 is moved further, the booster acts similarly.

Now, a description will be given with reference to FIGS. 2 and 3 illustrating the details of the construction of portion A in FIG. 1. Circumferentially extending grooves 10c are formed in the bearing 10b disposed on the inner (the left side in FIG. 2) end of the plunger 10 constituting a member associated with a power piston (which is formed by diaphragm 4, piston plate 13 and valve body 9 in the embodiment). A generally U-shaped resilient clip 21 is fitted in the grooves 10c. The output rod 20 has a chamfered end and an annular groove 20a as shown so that the output rod 20 can be inserted into the bearing 10b with the clip 21 fitted in the groove 10c, with the clip 21 being expanded by engaging with the chamfered end of the output rod 20 and engaging with the groove 20a thereby retaining the output rod 20 in the bearing 10b.

The axial length or the width of the groove 20a in the output rod 20 is larger than the width of the clip 21 or the diameter of wire when the clip is made of a wire having a circular cross-section, so that some amount of relative movement is allowed between the plunger 10 and the output rod 20 to permit smooth operation of the vacuum booster while preventing escape of the output rod 20.

FIG. 4 and 5 illustrate a modified embodiment of the present invention, in which the circumferential grooves 10c in the first embodiment are replaced by small radial holes 10d in which are received balls 22 such as steel balls. A cylindrical spring 23 having a small wall thickness surrounds the outer periphery of the bearing portion 10b to retain the balls in their positions, the cylindrical spring 23 and the balls 22 constituting retaining means.

Another embodiment of the present invention is shown in FIGS. 6 and 7. As compared to the embodiment of FIGS. 1-3 wherein a male portion constituted by output rod 20 engages with a female portion formed in plunger 10 in a male and female engagement, a reduced diameter portion 10e is, in this embodiment, formed on the inner end of the plunger 10 to act as a male portion for engaging with a bore 20b formed in the adjacent end of output rod 20 acting as a female portion. A clip 21 similar to the first embodiment is received in U-grooves formed in the output rod 20 and the reduced diameter portion 10e of the plunger 10. The operation of the embodiment is the same as that of the first embodiment.

Figure 8:
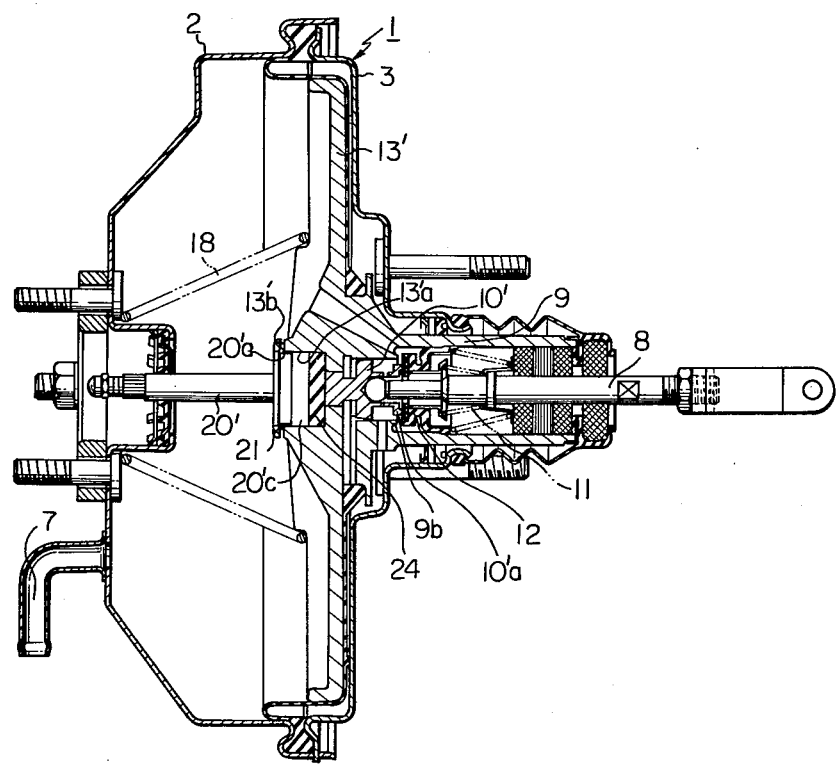
FIG. 8 is a longitudinal cross-sectional view of a further modified vacuum booster.

FIG. 8 illustrates another embodiment of the present invention. The embodiment differs from the embodiments of FIGS. 1-7 wherein the output rod 20 is supported by male and female engagement on the plunger 10 which is associated with power piston but is movable relative to the power piston. An embodiment of FIG. 8, output rod 20' is slidably supported in the power piston in direct male and female engagement. As shown in the drawing, an enlarged diameter portion 20'c is formed on the inner end of output rod 20' and is fitted in a bore 13'a formed in a power piston 13'. An annular groove 20'a similar to the groove 20a of the first embodiment is formed in the outer circumference of the enlarged diameter portion 20'c and grooves 13'c similar to the grooves 10c in the first embodiment are formed in the power piston 13' for receiving U-shaped clip 21. The power piston 13' is an integral member having a construction and function combining those of the piston plate 13 and the valve body 9 in the first embodiment, and receives a plunger 10' having a modified form slidably therein. A reaction disc 24 is disposed between the plunger 10' and the output 20'. The construction and operation of the embodiment is otherwise the same to that of the first embodiment.

It will be noted that the member 10 or 13' with which the output rod is slidably engaged may be formed of power piston itself or of a member associated with the power piston and, which is referred as a member on the power piston side.

As hereinbefore described, the vacuum booster according to the present invention has the output rod retained on a member of the power piston side such as the plunger in a manner which permits relative sliding movement to a predetermined extent but preventing movement exceeding that extend, thereby avoiding escape of the output rod from the vacuum booster. Therefore, it is possible to perform an assembling or transporting operation reliably.

What is claimed is:

1. A vacuum booster comprising a casing, a resilient diaphragm in said casing and having the outer periphery secured to the casing and dividing the interior thereof into two chambers, means connecting one of said chambers permanently to a source of vacuum, a power piston secured to said diaphragm, a valve mechanism incorporated in said power piston for selectively connecting the other chamber with said one chamber or a source of pressure higher than the vacuum pressure, an input rod connected to the valve mechanism for actuating the valve mechanism for generating differential pressure between said two chambers, an output rod member for receiving the force corresponding to the differential pressure from the power piston, said valve mechanism having a member on an end toward said output rod member, a pin-and-socket connection connecting the output rod member to said member of said valve mechanism, said pin-and-socket connection having a pin on one of said members and a socket on the other of said members snugly receiving the pin, said pin having an annular groove therein and a generally U-shaped resilient wire rod with two parallel arm portions engaged in said groove with an axial clearance sufficient for allowing free relative axial movement between the pin and socket corresponding to the dimension of said groove along said pin in a normal operating condition of the vacuum booster, said socket having two diametrically opposite grooves each extending along a chord of the socket and completely through the thickness of the wall of the socket in which the parallel arm portions are received for projecting into the annular groove in said pin, whereby said resilient wire rod prevents escape of said pin from said socket during assembly or repair of said vacuum booster.

* * * * *